(12) United States Patent
Beppu (10) Patent No.: US 11,218,610 B2
(45) Date of Patent: Jan. 4, 2022

(54) READING APPARATUS AND MULTI FEED DETECTION METHOD

(71) Applicant: SEIKO EPSON CORPORATION, Tokyo (JP)

(72) Inventor: Wataru Beppu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/939,608

(22) Filed: Jul. 27, 2020

(65) Prior Publication Data

US 2021/0037153 A1    Feb. 4, 2021

(30) Foreign Application Priority Data

Jul. 30, 2019    (JP) .............................. JP2019-139460

(51) Int. Cl.
| | |
|---|---|
| *H04N 1/04* | (2006.01) |
| *H04N 1/00* | (2006.01) |
| *H04N 1/12* | (2006.01) |

(52) U.S. Cl.
CPC ..... *H04N 1/00628* (2013.01); *H04N 1/00689* (2013.01); *H04N 1/00745* (2013.01); *H04N 1/121* (2013.01)

(58) Field of Classification Search
CPC ........... H04N 1/00559; H04N 1/00538; H04N 1/1017; H04N 2201/0422; H04N 2201/0428; H04N 1/00628; H04N 1/00689; H04N 1/00745; H04N 1/121
USPC ......................... 358/498, 496; 399/364, 367
See application file for complete search history.

(56) References Cited

U.S. PATENT DOCUMENTS

| | | | | |
|---|---|---|---|---|
| 9,560,228 | B2* | 1/2017 | Aizono | ................ H04N 1/0057 |
| 2008/0008506 | A1* | 1/2008 | Nagano | .............. G03G 15/6511 |
| | | | | 399/389 |
| 2009/0037018 | A1* | 2/2009 | Saikawa | ................... G06K 7/08 |
| | | | | 700/223 |
| 2017/0126914 | A1 | 5/2017 | Koyanagi | |
| 2018/0086579 | A1* | 3/2018 | Andoh | .................... B65H 5/062 |
| 2021/0155430 | A1* | 5/2021 | Furukawa | ................ B65H 7/18 |

FOREIGN PATENT DOCUMENTS

| | | | |
|---|---|---|---|
| JP | 2017-085452 | A | 5/2017 |
| JP | 2017149522 | A * | 8/2017 |
| JP | 2020132373 | A * | 8/2020 |
| JP | 2021-035013 | | 3/2021 |

* cited by examiner

*Primary Examiner* — Cheukfan Lee
(74) *Attorney, Agent, or Firm* — Workman Nydegger (57) ABSTRACT

A reading apparatus includes a transport unit that transports a document along a transport path, a multi feed detection unit that detects multi feed for a transport document that is the document being transported by the transport unit, a reading unit that reads the transported document, and a controller that controls the transport unit, wherein the controller acquires a multi feed length that is a length of a range in which multi feed occurs in the transported document according to a detection result of multi feed by the multi feed detection unit, causes the transport unit to stop transport of a document following the transport document by when the multi feed length is equal to or greater than a predetermined threshold value for the multi feed length, and causes the transport unit to perform transport of the following document when the multi feed length is less than the threshold value.

6 Claims, 8 Drawing Sheets

READING APPARATUS AND MULTI FEED DETECTION METHOD

The present application is based on, and claims priority from JP Application Serial Number 2019-139460, filed Jul. 30, 2019, the disclosure of which is hereby incorporated by reference herein in its entirety.

BACKGROUND

1. Technical Field

The present disclosure relates to a reading apparatus configured to transport and read a document and a multi feed detection method.

2. Related Art

When a plurality of documents to be read is placed on a document tray, the scanner draws the documents one by one into a transport path and transports the documents. In rare cases, the reading apparatus may transport a plurality of overlapped documents. Transporting a single document is referred to as single feed, and transporting a plurality of overlapped documents is referred to as multi feed.

A configuration is disclosed in which when multi feed of documents is detected by the multi feed sensor, transport of the documents and reading of the documents by the reading unit are stopped (see JP-A-2017-85452).

Under the setting that transport of the documents is stopped when multi feed of the documents is detected, there is a case where it is not necessary to stop the transport even when the multi feed is detected by the multi feed sensor. For example, when the multi feed is detected due to the presence of a label attached to a partial area of the document, there is no problem even when the subsequent document transport is continued. In such a case, when the transport is stopped based on the above settings, the user needs to restart the scan operation or sometimes open the scanner housing, remove the document being transported, and reset it on the document tray, so that the burden on the user is heavy.

On the other hand, under the setting that the transport is not stopped until the transport of all the documents in the document tray is completed even when the multi feed of documents is detected, the transport is not stopped even when a plurality of overlapped documents is actually transported. In such a case, after all the documents have been transported and discharged to the paper discharge tray, the user is required to search for some documents that were not read due to multi feed and scan them again, so that the burden on the user is heavy. As described above, in the related art, the flexibility in responding to the detection of multi feed is poor, and there is room for improving the user convenience.

SUMMARY

A reading apparatus includes a transport unit that transports a document along a transport path, a multi feed detection unit that detects multi feed for a transport document that is the document being transported by the transport unit, a reading unit that reads the transported document, and a controller that controls the transport unit, wherein the controller acquires a multi feed length that is a length of a range in which multi feed occurs in the transported document according to a detection result of multi feed by the multi feed detection unit, causes the transport unit to stop transport of a document following the transport document by when the multi feed length is equal to or greater than a predetermined threshold value for the multi feed length, and causes the transport unit to perform transport of the following document when the multi feed length is less than the threshold value.

DESCRIPTION OF EXEMPLARY EMBODIMENTS

Hereinafter, embodiments of the present disclosure will be described with reference to the drawings. The drawings are only an example for describing the embodiments. Since the drawings are an example, the ratio or shape may not be accurate, or they may not be in agreement with each other or may be partially omitted.

1. Device Configuration

Figure 1:
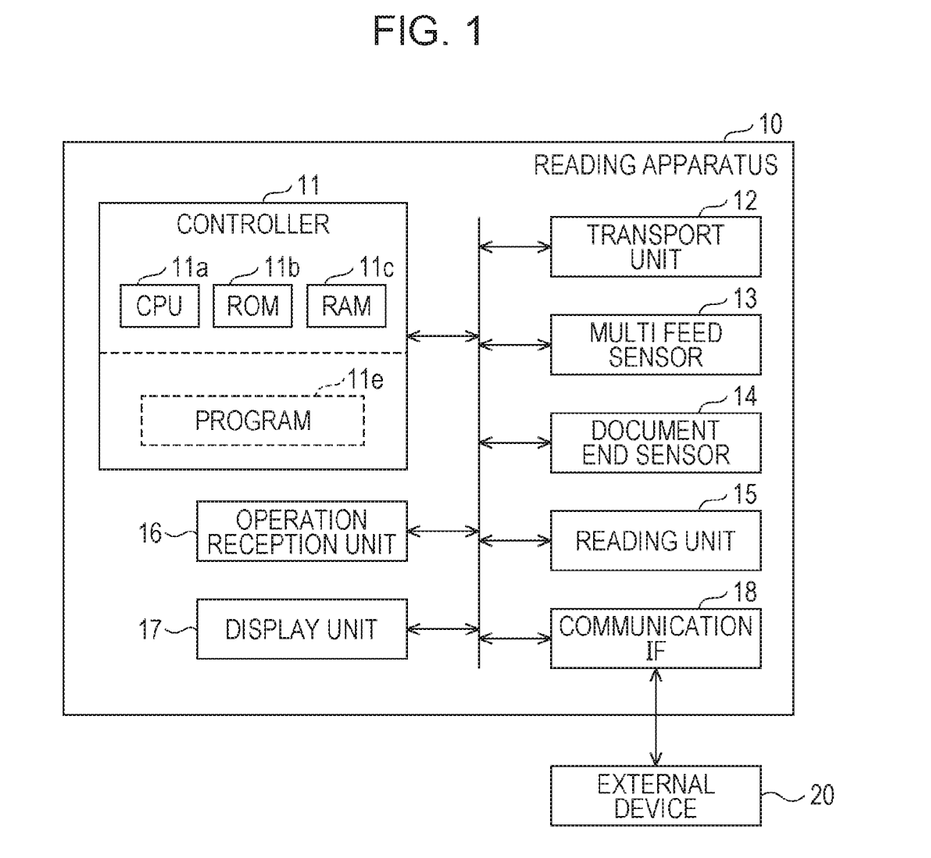
FIG. 1 is a block diagram showing a schematic configuration of a reading apparatus.

FIG. 1 schematically shows a configuration of a reading apparatus 10 according to the present embodiment. The reading apparatus 10 is a scanner capable of reading a printed document. The reading apparatus 10 performs a multi feed detection method. The reading apparatus 10 includes a controller 11, a transport unit 12, a multi feed sensor 13, a document end sensor 14, a reading unit 15, an operation reception unit 16, a display unit 17, and a communication interface 18. The interface is abbreviated as an IF. The controller 11 includes, for example, a CPU 11a as a processor, a memory such as a ROM 11b and a RAM 11c, and other storage means, and controls respective units of the reading apparatus 10 according to a program 11e stored in the memory. The processor constituting the controller 11 is not limited to one CPU, and may be configured to perform processing by a plurality of CPUs or a hardware circuit such as an application specific integrated circuit (ASIC), or may be a configuration in which the CPU and the hardware circuit cooperate to perform processing.

The transport unit 12 transports the document from upstream to downstream of the transport path under the control of the controller 11. The direction from upstream to downstream of the transport path may be referred to as a transport direction. Upstream and downstream of the transport path are also simply referred to as upstream and downstream. The document is typically a paper medium, but may be a sheet-like medium made of a material other than paper. The transport unit 12 includes a plurality of rollers for transporting a document, and a motor that applies power to the rollers, and rotates the rollers.

The reading unit 15 is a mechanism for optically reading a document under the control of the controller 11. The reading unit 15 includes a light source that irradiates a document, an image sensor that outputs charges according to the transmitted light or reflected light from the document, an optical system for guiding light to the image sensor. The document transported by the transport unit 12 is read by the reading unit 15. Therefore, the reading apparatus 10 corresponds to a sheet feed scanner. At least part of the transport unit 12 may be referred to as an automatic paper feeding device or an auto document feeder (ADF).

The multi feed sensor 13 is a sensor that detects the multi feed of a document. The document end sensor 14 is a sensor that detects the presence or absence of a document. The operation reception unit 16 is a unit that receives an operation from a user, and is, for example, a physical button or a touch panel. The display unit 17 is a unit that displays visual information, and is constituted by, for example, a liquid crystal display or an organic EL display. Of course, the touch panel may be implemented as one function of the display unit 17.

The communication IF 18 is a general term for one or a plurality of IFs for allowing the reading apparatus 10 to perform wired or wireless communication with the outside in accordance with a predetermined communication protocol including a known communication standard. In the example of FIG. 1, the reading apparatus 10 is communicably connected to an external device 20 via the communication IF 18. The external device 20 is, for example, a personal computer (PC). The reading apparatus 10 may be a multifunction machine having a plurality of functions such as a print function, a facsimile communication function, and an e-mail transmission function in addition to the function as a scanner.

Figure 2:
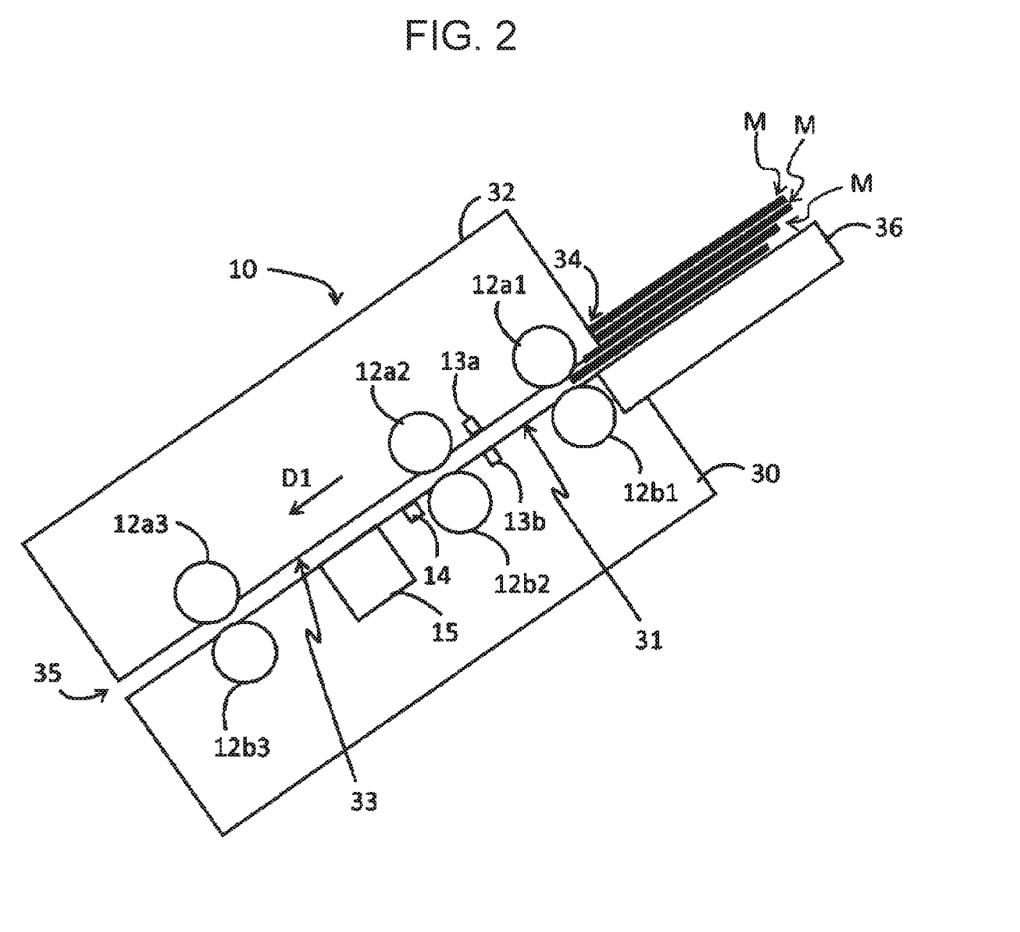
FIG. 2 is a diagram simply showing a mechanical structure of a reading apparatus including a transport path.

FIG. 2 schematically shows the mechanical structure of the reading apparatus 10 including a transport path 33. As shown in FIG. 2, the reading apparatus 10 includes a main body 30 and a lid 32 that covers an upper face 31 of the main body 30. The lid 32 can be opened/closed with respect to the main body 30. The transport path 33 through which the transport unit 12 transports a document M is provided between the main body 30 and the lid 32. The transport unit 12 takes the document M from an upstream supply port 34 into the transport path 33. In addition, the transport unit 12 discharges the document M from a discharge port 35 downstream of the transport path 33 to the outside of the reading apparatus 10. Reference symbol D1 indicates a transport direction D1. Note that at least part of the transport path 33 may be curved.

In the vicinity of the supply port 34, a document tray 36 on which the document M to be read is placed is provided. The document tray 36 extends further upstream of the supply port 34. The document tray 36 has, upstream of the upper face 31, a surface continuous with the upper face 31 of the main body 30. The document tray 36 may be referred to as a document support unit, a document placement unit, or the like.

The reading unit 15 is housed inside the main body 30. In the example of FIG. 2, the reading unit 15 reads a surface of the document M transported along the transport path 33 by the transport unit 12, where the surface faces the upper face 31 of the main body 30. However, the reading apparatus 10 may have a configuration in which a reading unit is further provided at a position where a surface, facing the lid 32, of the document M transported along the transport path 33 by the transport unit 12 can be read. That is, the reading apparatus 10 may be a scanner that can simultaneously read both surfaces of the document M.

FIG. 2 shows some pairs of rollers that face each other across the transport path 33 as the rollers that constitute part of the transport unit 12. A roller pair formed by a roller 12a1 and a roller 12b1 is referred to as a first roller pair 12a1, 12b1. A roller pair formed by a roller 12a2 and a roller 12b2 is referred to as a second roller pair 12a2, 12b2. A roller pair including a roller 12a3 and a roller 12b3 is referred to as a third roller pair 12a3, 12b3. The rollers 12a1, 12a2, and 12a3 are disposed on the lid 32, and the rollers 12b1, 12b2, and 12b3 are disposed on the main body 30. Each roller pair transports the document M by pinching the document M between the rollers constituting the pair and rotating.

The most upstream first roller pair 12a1, 12b1 among the roller pairs shown in FIG. 2 is disposed at a position slightly downstream of the supply port 34. The first roller pair 12a1, 12b1 takes one document M from the bundle of a plurality of documents M placed on the document tray 36 into the transport path 33 and transports the taken document M downstream. That is, the first roller pair 12a1, 12b1 ideally performs single feed. However, the first roller pair 12a1, 12b1 may take two or more documents M into the transport path 33 at the same time.

The second roller pair 12a2, 12b2 located downstream of the first roller pair 12a1, 12b1 and upstream of the reading unit 15 transports the document M transported by the first roller pair 12a1, 12b1 further downstream. When the document M transported by the second roller pair 12a2, 12b2 passes through the position of the reading unit 15 in the transport path 33, the document M is read by the reading unit 15. The most downstream third roller pair 12a3, 12b3 among the roller pairs shown in FIG. 2 is disposed downstream of the reading unit 15. The third roller pair 12a3, 12b3 transports the document M transported by the second roller pair 12a2, 12b2 further downstream, and discharges the transported document M to the outside through the discharge port 35.

In the example of FIG. 2, the multi feed sensor 13 is provided at a position downstream of the first roller pair 12a1, 12b1 and upstream of the second roller pair 12a2, 12b2. The multi feed sensor 13 is, for example, an ultrasonic sensor, and includes a transmitter 13a that transmits ultrasonic waves and a receiver 13b that receives the ultrasonic waves transmitted by the transmitter 13a. The transmitter 13a and the receiver 13b are disposed at positions facing each other with the transport path 33 interposed therebetween. The multi feed sensor 13 detects the multi feed using the principle that the ultrasonic wave from the transmitter 13a is attenuated when passing through the document M. The degree of attenuation of the ultrasonic wave when passing through the multi fed documents M is greater than the degree of attenuation of the ultrasonic wave when passing through the single fed document M. For this reason, when the detection signal output by the receiver 13b according to the received ultrasonic wave falls below a predetermined threshold value for the multi feed detection, the multi feed is detected, and when the detection signal is equal to or greater than the threshold value, the single feed can be detected.

In the example of FIG. 2, the document end sensor 14 is disposed at a position downstream of the second roller pair 12a2, 12b2 and upstream of the reading unit 15. The document end sensor 14 detects the presence or absence of a document. Specifically, when a state in which the document does not exist is switched to a state in which the document exists, that is, when the leading end of the document M reaches the position of the document end sensor 14, the document end sensor 14 switches the output from a predetermined off signal to a predetermined on signal. Also, when the state where the document exists is switched to the state where the document does not exist, that is, when the rear end of the document M reaches the position of the document end sensor 14, the document end sensor 14 switches the output from an on signal to an off signal. The leading end of the document M is an end, of the document M, facing downstream, and the rear end of the document M is an end, of the document M, facing upstream.

The positions of the transmitters 13a and the receiver 13b as the multi feed sensor 13 in the transport path 33 and the position of the document end sensor 14 are not limited to the illustrated positions. For example, the multi feed sensor 13 may be disposed at a position downstream of the second roller pair 12a2, 12b2 and upstream of the reading unit 15. Further, the document end sensor 14 may be provided at a position downstream of the first roller pair 12a1, 12b1 and upstream of the second roller pair 12a2, 12b2. Further, the multi feed sensor 13 and the document end sensor 14 may be disposed at substantially the same position on the transport path 33.

2. Read Control Process

First Embodiment

Figure 3:
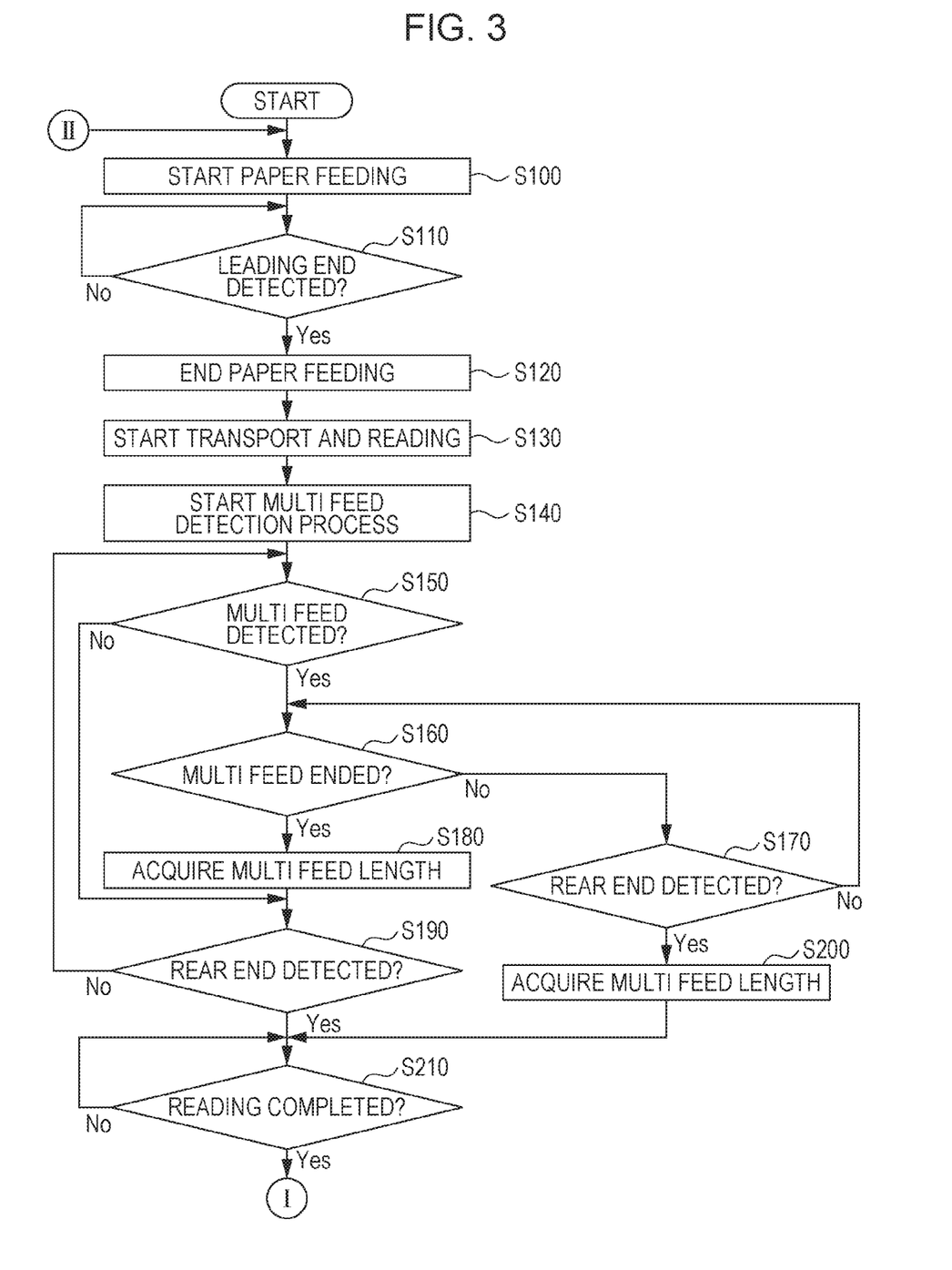
FIG. 3 is a flowchart showing part of a reading control process according to a first embodiment.
Figure 4:
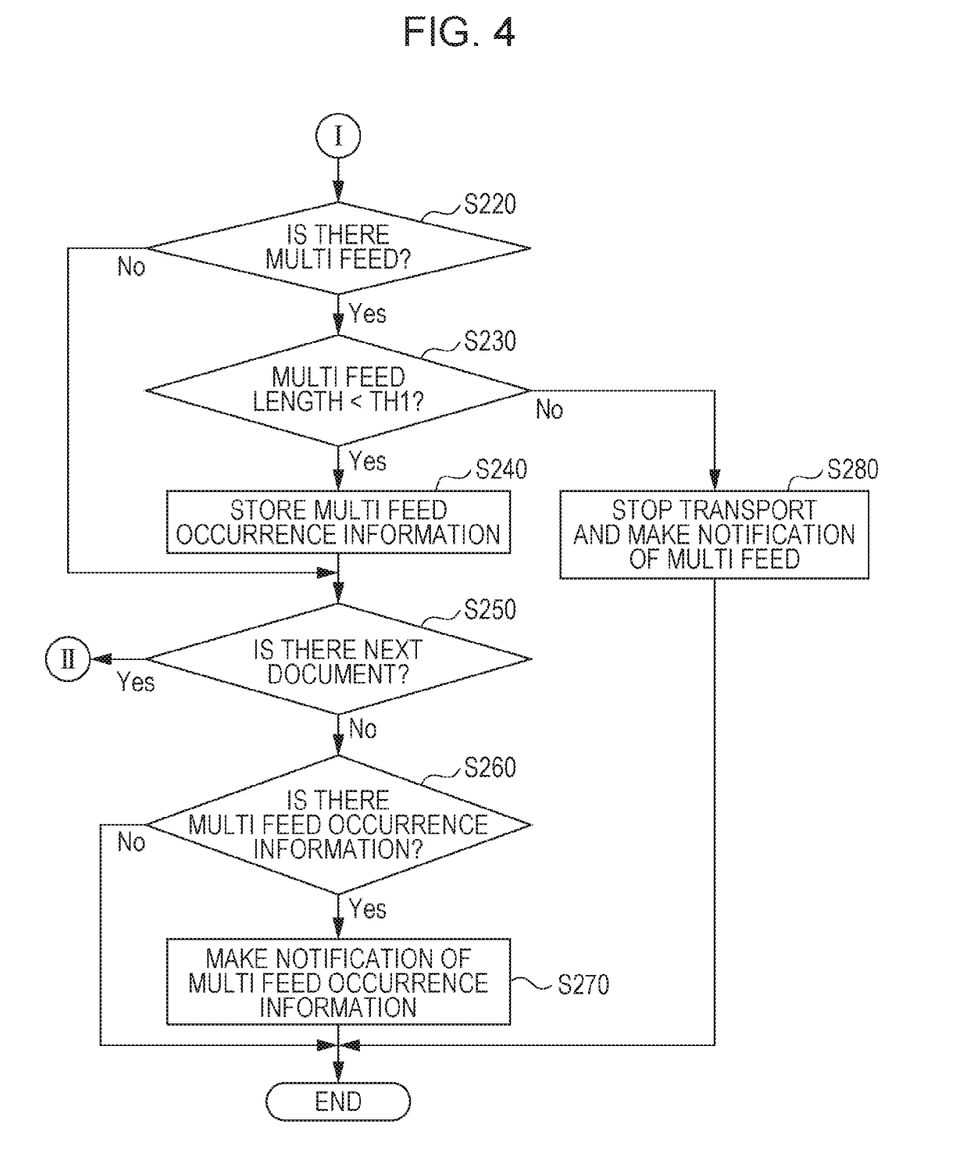
FIG. 4 is a flowchart showing the remaining part of the reading control process according to the first embodiment.

FIGS. 3 and 4 are flowcharts showing a reading control process performed by the controller 11 according to the program 11e. The reading control process described with reference to FIGS. 3 and 4 is referred to as the "first embodiment". In the present embodiment, the reading control process represents the entire process including document transport, document reading, and various measures according to the document multi feed detection process.

The controller 11 starts the reading control process when receiving a scan start instruction from the outside. The scan start instruction is input to the reading apparatus 10 by the operation of the operation reception unit 16 performed by the user. Alternatively, the reading apparatus 10 receives the scan start instruction transmitted from the external device 20 via the communication IF 18.

In step S100, the controller 11 instructs the transport unit 12 to feed the document M, thereby causing the transport unit 12 to start the paper feeding. The paper feeding is a type of transport, and is a process of sending the document M from the document tray 36 to a predetermined position immediately before the reading unit 15 reads the document M. In step S100, the first roller pair 12a1, 12b1 starts rotating, the document M placed on the document tray 36 is taken into the transport path 33 and transported downstream.

After step S100, the controller 11 repeatedly determines whether to have detected the leading end of the document M being fed (step S110). When detecting the leading end of the document M, the controller 11 makes the "Yes" determination in step S110 and advances the process to step S120. The controller 11 continuously inputs the output from the document end sensor 14, and determines that the leading end of the document M has been detected when the output from the document end sensor 14 is switched from the off signal to the on signal.

In step S120, the controller 11 ends the paper feeding. In other words, the transport until the leading end of the document M reaches the position of the document end sensor 14 is the paper feeding. The controller 11 stops the rotation of the first roller pair 12a1, 12b1 when the paper feeding of the document M is completed. After feeding the document M, the controller 11 starts transport and reading of the document M (step S130). The transport started in step S130 is a transport for reading and discharging the document M, and is implemented by rotating the second roller pair 12a2, 12b2 and the third roller pair 12a3, 12b3.

It is not necessary to stop the document M between the paper feeding and the transport after the end of the paper feeding. Actually, the feeding of the document M and the transport after the end of the paper feeding are continuously performed. Further, the controller 11 does not need to cause the reading unit 15 to start reading at the same time when the feeding of the document M is completed. After the paper feeding is completed, the controller 11 may cause the reading unit 15 to start reading the document M after waiting for a known time required to transport the document M by a distance from the document end sensor 14 to the reading unit 15 along the transport path 33.

Following step S130, in step S140, the controller 11 starts a multi feed detection process for the transport document. The multi feed detection process corresponds to a multi feed detection step. The "transport document" means the document M currently being transported by the transport unit 12. The controller 11 that has started the multi feed detection process drives the transmitter 13a and the receiver 13b as the multi feed sensor 13 and receives a detection signal output from the receiver 13b. The controller 11 compares the received detection signal with a predetermined threshold value for the multi feed detection to determine the detection result as the single feed, when the detection signal is equal to or greater than the threshold value, and to determine the detection result as the multi feed when the detection signal is less than the threshold value. After step S130, such a multi feed detection process is continuously performed until the rear end of the transport document is detected. The multi feed sensor 13 and the controller 11 that detects the multi feed or the single feed based on a detection signal from the multi feed sensor 13 correspond to a "multi feed detection unit".

In step S150, the controller 11 branches the process depending on whether the multi feed has been detected. When detecting the multi feed, the controller 11 advances the process to step S160 as a result of the "Yes" determination in step S150, and on the other hand, when detecting the single feed, the controller 11 advances the process to step S190 as a result of the "No" determination in step S150.

In step S190, the controller 11 determines whether the rear end of the transport document has been detected. When detecting the rear end of the transport document, the controller 11 makes the "Yes" determination in step S190, and advances the process to step S210. On the other hand, when the rear end of the transport document is not detected, the controller 11 makes the "No" determination in step S190, and advances the process to step S150. The controller 11 determines that the rear end of the transport document has been detected when the output from the document end sensor 14 switches from the on signal to the off signal. After starting the multi feed detection process in step S140, when the "Yes" determination is made in step S190 after the "No" determination in step S150, and the "No" determination in step S190 are repeated, it means that no multi feed is detected for the transport document.

In step S160, the controller 11 branches the process depending on whether the state in which the multi feed is detected has ended. That is, when the single feed has been detected after making the "Yes" determination in step S150, the controller 11 makes the "Yes" determination in step S160, and advances the process to step S180. On the other hand, when the multi feed is still detected after making the "Yes" determination in step S150, the controller 11 makes the "No" determination in step S160, and advances the process to step S170.

As in step S190, in step S170, the controller 11 determines whether the rear end of the transport document has been detected. When detecting the rear end of the transport document, the controller 11 makes the "Yes" determination in step S170, and advances the process to step S200. On the other hand, when the rear end of the transport document is not detected, the controller 11 makes the "No" determination in step S170, and advances the process to step S160.

In step S180, the controller 11 acquires the "multi feed length" that is the length of the range in which the multi feed occurs in the transport document. Step S180 and step S200 described later correspond to the multi feed length acquiring step. The range in which the multi feed occurs in the transport document is referred to as a "multi feed range". The multi feed length is a length along the transport path 33. In step S180, the controller 11 can calculate the multi feed length by multiplying the elapsed time from the time of the "Yes" determination in step S150 to the time of the "Yes" determination in step S160 by the known speed of transport of the document M by the transport unit 12. After step S180, the controller 11 makes a determination of step S190.

Also in step S200, the controller 11 acquires the multi feed length of the transport document. In step S200, the controller 11 can calculate the multi feed length by multiplying the elapsed time from the time of the "Yes" determination in step S150 to the time of the "Yes" determination in step S170 by the known speed of transport of the document M by the transport unit 12. After step S200, controller 11 advances the process to step S210.

It can be said that the multi feed length acquired in step S180 represents a length of multi feed occurring in partial range among the range from the leading end to the rear end of the transport document. On the other hand, the multi feed length acquired in step S200 is assumed to be a length of multi feed occurring in a relatively long range up to the rear end or near the rear end of the transport document. Step S180 may be performed a plurality of times on the transport document. On the other hand, step S200 is not performed a plurality of times on the transport document. Step S200 may be performed after step S180 is performed on the transport document.

In step S210, the controller 11 repeatedly determines whether the reading of the transport document by the reading unit 15 is completed. When the reading of the transport document is completed, the controller 11 advances the process to step S220 in FIG. 4 as a result of the "Yes" determination in step S210. For example, the controller 11 may make the "Yes" determination in step S210 after waiting for a known time required for the rear end of the transport document to pass through the reading unit 15 after the document end sensor 14 detects the rear end.

In step S220, the controller 11 branches the process depending on whether there is the multi feed for the transport document. That is, when the multi feed has been detected at least once by the multi feed detection process started in step S140, the controller 11 advances the process to step S230 as a result of the "Yes" determination in step S220. On the other hand, when no multi feed has been detected by the multi feed detection process started in step S140, the controller 11 advances the process to step S250 as a result of the "No" determination in step S220.

In step S230, the controller 11 compares the multi feed length acquired in step S180 or S200 for the transport document with a predetermined threshold value TH1 for the multi feed length. When the multi feed length is less than TH1, the controller 11 advances the process to step S240 as a result of the "Yes" determination in step S230, and on the other hand, when the multi feed length is equal to or greater than TH1, the controller 11 advances the process to step S280 as a result of the "No" determination in step S230. When the controller 11 acquires the multi feed length for the transport document a plurality of times, in step S230, the longest multi feed length among the multi feed lengths acquired a plurality of times may be compared with the threshold value TH1.

In step S240, the controller 11 stores, in a predetermined storage unit, multi feed occurrence information indicating that the multi feed has occurred to the transport document. The predetermined storage unit is, for example, the RAM 11c or other memory included in the reading apparatus 10, or a storage unit included in the external device 20. After step S240, controller 11 makes a determination of step S250.

In step S250, the controller 11 determines the presence or absence of the following document M. When there is the following document M, the process returns to step S100 as a result of the "Yes" determination, and when there is no following document M, the process proceeds to step S260 as a result of the "No" determination. For example, a sensor (not shown) that detects the document M is mounted on the document tray 36, and the controller 11 may determine, based on the output signal from the sensor, the presence or absence of the document M in the document tray 36, that is, the presence or absence of the following document M.

In step S100, which is a step ahead of step S250, paper feeding of the following document M is started. In other words, the following document M is a new document to be transported, and the processes after step S100 are performed. According to the flow of steps S220, S230, S250, and S100, when the multi feed length is less than the threshold value TH1, the controller 11 causes the transport unit 12 to perform the transport of the following document M.

In step S260, the controller 11 branches the process according to the presence/absence of the multi feed occurrence information stored in step S240 after the start of the flowchart of the reading control process being performed. That is, when step S240 has been performed at least once, the controller 11 makes "Yes" determination in step S260 and advances the process to step S270. On the other hand, when step S240 has never been performed since the start of the flowchart of the reading control process being performed, the controller 11 makes the "No" determination in step S260, and ends the flowchart.

In step S270, the controller 11 notifies the outside of the multi feed occurrence information stored in the predetermined storage unit in step S240. For example, the controller 11 displays, on the display unit 17, the content of the multi feed occurrence information stored in the memory in the reading apparatus 10 in step S240. Further, for example, the controller 11 requests the PC to display, on the display unit of the PC, the content of the multi feed occurrence information stored in the PC as the external device 20 in step S240.

When the "No" determination is made in step S250, the reading of the document M last fed from the document tray 36 is completed. Therefore, step S270 can be a process in which when the transport unit 12 completes transport of the plurality of documents M placed on the document tray 36, a predetermined display unit displays the multi feed occurrence information stored in a predetermined storage unit. The controller 11 may perform step S270 after validating, based on the outputs from the transport unit 12 and various sensors, that the discharge of the document M last fed from the document tray 36 through the discharge port 35 is actually completed. After performing the step S270, the controller 11 ends the flowchart of the reading control process. According to step S270, the user can recognize that the multi feed has occurred in the course of the reading control process of the document M set in the reading apparatus 10 at the timing when all the documents M have been transported.

In step S280, the controller 11 stops the transport of the document M and makes a notification of the multi feed. After performing step S280, the controller 11 ends the flowchart of the reading control process. The transport stop in step S280 is any one of a first transport stop process for stopping the drive of the transport unit 12 after completing the discharge of the transport document through the discharge port 35, and a second transport stop process for stopping the driving of the transport unit 12 when the "No" determination is made in step S230. Whether to perform the first transport stop process or the second transport stop process in step S280 is set in advance in accordance with an operation input by the user before the reading control process.

According to the first transport stop process, the document M which is the transport document is discharged out of the reading apparatus 10, and the following document M is not fed. On the other hand, according to the second transport stop process, the transport of the transport document is stopped at a time immediately after the reading by the reading unit 15 is completed, and the transport document remains in the transport path 33, and further, the following document M is not fed. According to the flow of steps S220, S230, and S280, when the multi feed length is equal to or greater than the threshold value TH1, the controller 11 causes the transport unit 12 to stop the transport of the following document M. Step S230, step S100 performed after step S250 according to the determination in step S230 and step S280 performed according to the determination in step S230 correspond to the transport control step.

As the multi feed notification in step S280, the controller 11 notifies the outside that the multi feed has occurred. For example, the controller 11 displays the multi feed notification on the display unit 17. In addition, for example, the controller 11 requests a PC as the external device 20 to display the multi feed notification on a display unit of the PC. According to step S280, when the multi feed occurs to the transport documents during the process of controlling reading of the document M set on the reading apparatus 10, transport of at least the document M following the multi feed transport document is stopped, and in addition, the user can recognize, almost simultaneously when the transport is stopped, that the multi feed has occurred.

Steps S260 and S270 are not required processes in this embodiment. The present embodiment also includes a mode in which the reading control process is ended without performing steps S260 and S270 when the "No" determination is made in step S250.

Although not specifically mentioned in the flowchart, image data for each document M generated as a result of reading the document M by the reading unit 15 is temporarily stored in a memory in the reading apparatus 10 by the controller 11, or is transmitted to the external device 20 via the communication IF 18 to be stored in the external device 20. The controller 11 may add the multi feed occurrence information on the document M to the image data as the result of reading the document M and transmit the image data with the multi feed occurrence information to the external device 20. According to such a configuration, when viewing the image data acquired and stored by the external device 20 from the reading apparatus 10 at any timing, the user can validate the multi feed occurrence information added to the image data. In addition, when the user operates the operation reception unit 16 at any timing different from the timing of the reading control process, user can display the multi feed occurrence information stored in the reading apparatus 10 through the past reading control process on the display unit 17 to validate the displayed information.

3. Second Embodiment

Figure 5:
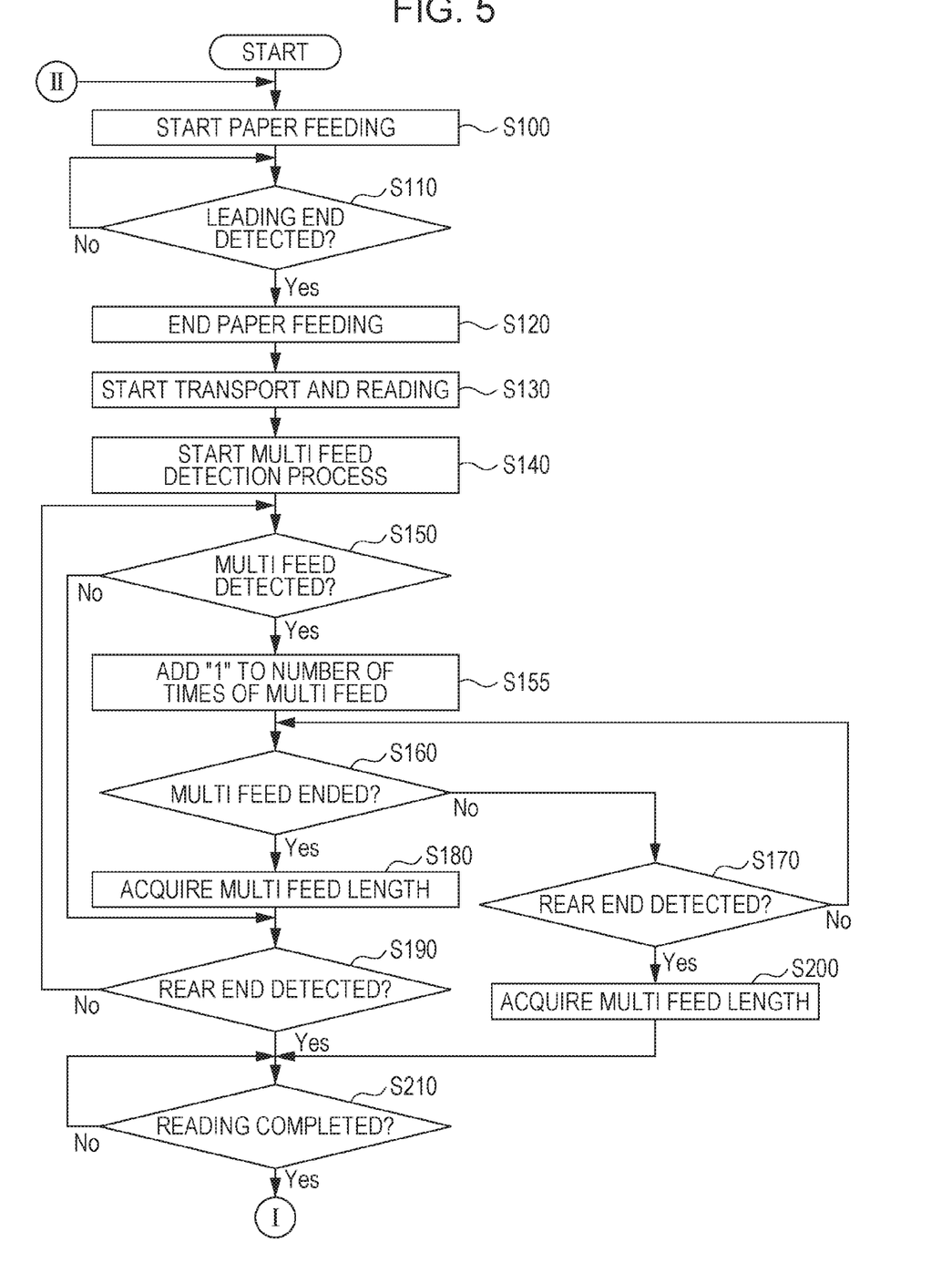
FIG. 5 is a flowchart showing part of a reading control process according to a second embodiment.
Figure 6:
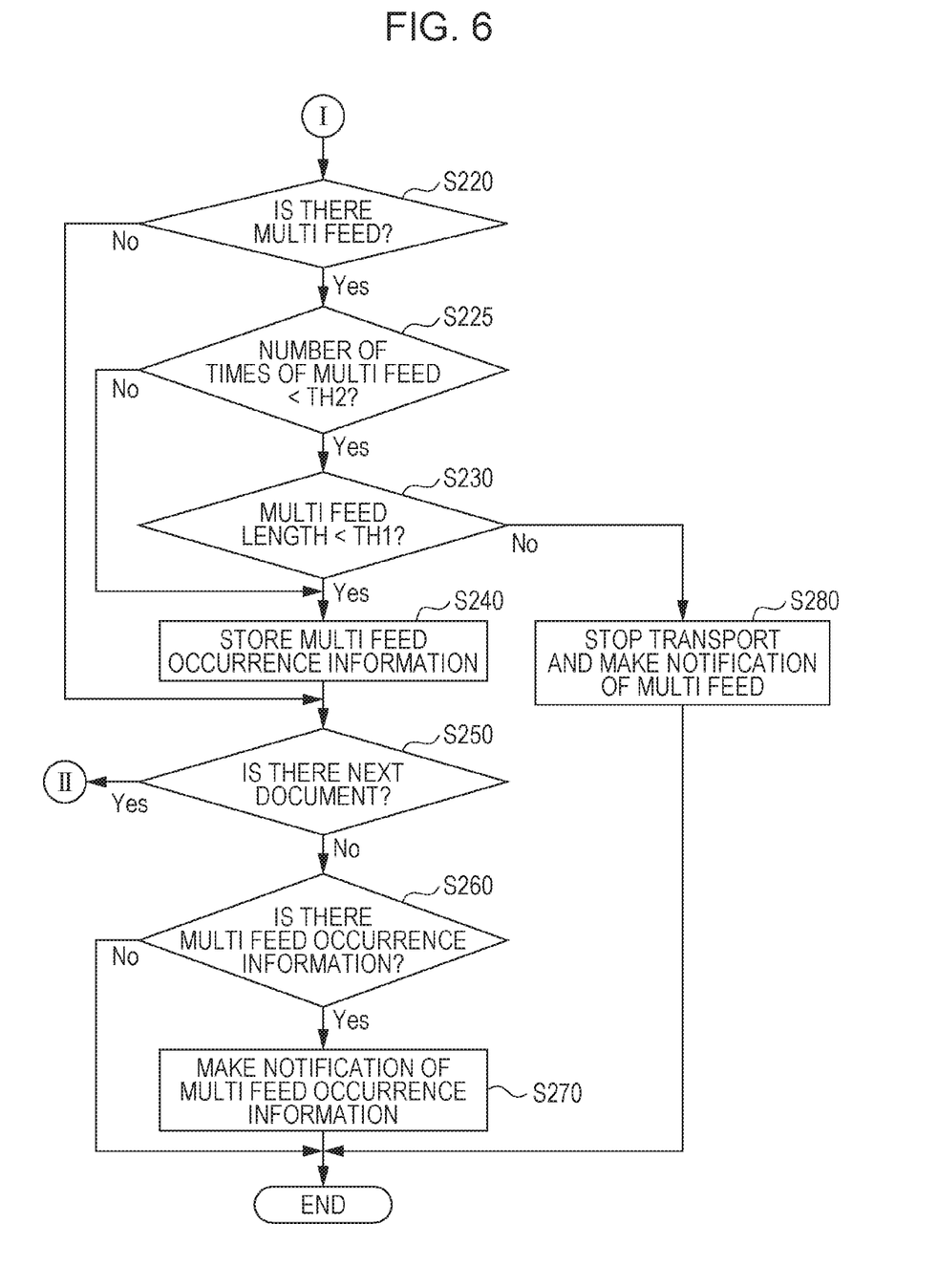
FIG. 6 is a flowchart showing the remaining part of the reading control process according to the second embodiment.

FIGS. 5 and 6 are flowcharts showing a reading control process performed by the controller 11 according to the program 11e. The reading control process described with reference to FIGS. 5 and 6 is referred to as the "second embodiment". Regarding the second embodiment, differences from the first embodiment described with reference to FIGS. 3 and 4.

FIG. 5 differs from FIG. 3 in that step S155 is provided. When making the "Yes" determination in step S150 as the multi feed has been detected, the controller 11 performs step S155 and advances the process to step S160. In step S155, the controller 11 adds "1" to the current number of times of multi feed. The controller 11 initializes the number of times of multi feed to zero each time paper feeding is started in step S100, that is, each time the transport document is switched to the following document M. The number of times of multi feed means the number of multi feed ranges that can be detected for the transport document during the period from when the multi feed detection process is started in step S140 to when the determination of step S210 is made.

FIG. 6 is different from FIG. 4 in that step S225 is provided. The controller 11 advances the process to step S225 as a result of the "Yes" determination in step S220. In step S225, the controller 11 compares the number of times of multi feed of the transport document acquired in step S155 with a predetermined threshold value TH2 for the number of times of the multi feed. When the number of times of the multi feed is less than TH2, the controller 11 advances the process to the determination in step S230 as a result of the "Yes" determination in step S225. On the other hand, when the number of times of the multi feed is equal to or greater than TH2, the controller 11 advances the process to step S240 as a result of the "No" determination in step S225.

Thus, in the second embodiment, according to the flow of steps S220, S225 (or S230), S250, and S100, when the number of times of the multi feed is equal to or greater than the threshold value TH2 or when the multi feed length is less than the threshold value TH1, the controller 11 causes the transport unit 12 to perform the transport of the following document M. On the other hand, according to the flow of steps S220, S225, S230, and S280, when the number of times of the multi feed is less than the threshold value TH2 and the multi feed length is equal to or more than the threshold value TH1, the controller 11 caused the transport unit 12 to stop transport of the following document M.

It can be said that the controller 11 practically counts the number of times of the multi feed of the transport document even in the first embodiment as well. In FIG. 3, the controller 11 may add "1" to the current number of times of multi feed of the transport document every time the multi feed length is acquired in step S180 or step S200 during the period from when the multi feed detection process is started in step S140 to when the determination in step S210 is made.

4. Specific Examples of Notification

Figure 7A:
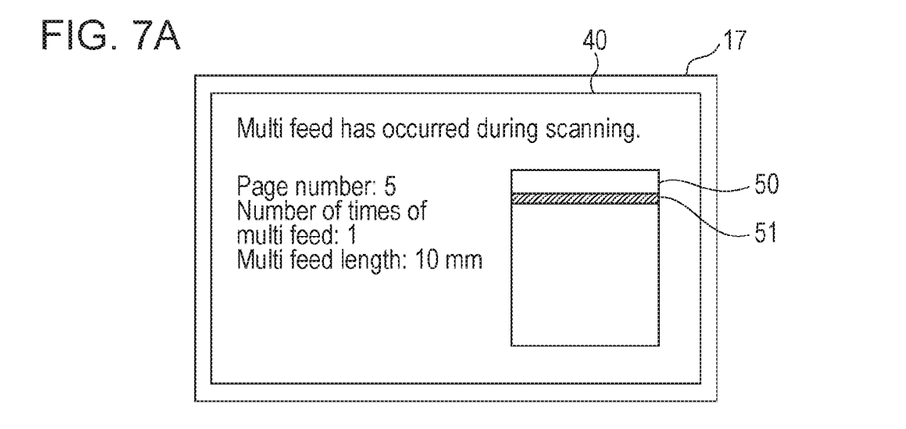
FIG. 7A is a diagram showing an example of a notification screen in step S270.

Specific examples of the notification in step S270 and step S280 in the first embodiment and the second embodiment will be described. FIG. 7A shows an example of a notification screen 40 displayed in step S270. The controller 11 displays the content of the multi feed occurrence information, for example, on the display unit 17 as the notification screen 40. As the multi feed occurrence information, detailed information such as a page number, the number of times of the multi feed, and a multi feed length in addition to a message indicating that the multi feed has occurred during scanning, that is, in the course of the reading control process is shown in the notification screen 40. The page number refers to a page number of the document M for which the multi feed is detected when the document M is a transport document, and indicates in what number the multi feed of the document M is detected among a plurality of documents M set on the document tray 36. In other words, the controller 11 stores, as part of the multi feed occurrence information, the page number of the document M at the time when the multi feed occurs. The number of times of the multi feed and the multi feed length are as described above. According to the notification screen 40 of FIG. 7A, the user recognizes that the multi feed is detected once during the transport of the document M of the page number "5", and the multi feed length is 10 mm.

10 mm as the multi feed length shown in FIG. 7A is shorter than the threshold value TH1. Also, although one as the number of times of the multi feed shown in FIG. 7A is smaller than the threshold value TH2, 10 mm is less than TH1 as described above, so that assuming the second embodiment, step S270 is performed after steps S225, S230, S240, and S260.

As shown in FIG. 7A, the notification screen 40 may display a scan image 50 of the document M in which the multi feed has been detected when the document M is a transport document and a multi feed range 51. The scan image 50 is image data generated as a result of reading the transport document by the reading unit 15, and is, more precisely, a reduced image based on the image data. The multi feed range 51 is displayed with, for example, hatched lines in the scan image 50. The controller 11 can acquire the multi feed range in the transport document based on the known distance between the multi feed sensor 13 and the document end sensor 14 along the transport path 33, a known transport speed of the document M by the transport unit 12, the timing at which the "Yes" determination is made in step S150, the timing at which the "Yes" determination is made in step S160, the timing at which the "Yes" determination is made in step S170, and the like. The controller 11 displays the multi feed range thus acquired as the multi feed range 51 in the scan image 50 of the document M in which the multi feed is detected when the document M is a transport document. In the notification screen 40, the length of the scan image 50 and the length of the multi feed range 51 in the longitudinal direction indicate the length of the document M and the multi feed length along the transport path 33, respectively.

In the flowchart of the reading control process, considering the possibility that it is determined in step S220 that there is the multi feed for each of the documents M to be fed in step S100, the multi feed occurrence information can be stored for each of the plurality of documents M. Therefore, in step S270, the controller 11 can generate the notification screen 40 corresponding to each of the documents M of the plurality of page numbers in which the multi feed occurrence information is stored to switch and display, depending on the user action, a plurality of notification screens 40 corresponding to respective page numbers.

Figure 7B:
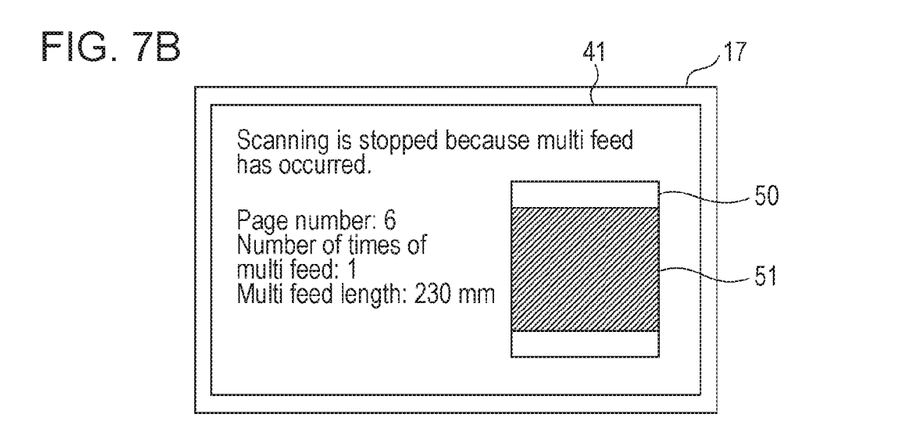
FIG. 7B is a diagram showing an example of a notification screen in step S280.

FIG. 7B shows an example of a notification screen 41 displayed in step S280. The controller 11 performs the multi feed notification in step S280 by, for example, displaying the notification screen 41 on the display unit 17. The way of viewing the notification screen 41 is the same as the way of viewing the notification screen 40 in FIG. 7A. In addition to a message indicating that the scanning, that is, the reading control process, is stopped because the multi feed has occurred, detailed information such as a page number, the number of times of multi feed, and a multi feed length as in the notification screen 40 is shown in the notification screen 41. According to the notification screen 41 of FIG. 7B, the user recognizes that the multi feed is detected once during the transport of the document M of the page number "6", and the multi feed length is 230 mm. 230 mm as the multi feed length shown in FIG. 7B is longer than the threshold value TH1. Also in the notification screen 41 shown in FIG. 7B, the scan image 50 of the transport document and the multi feed range 51 in the scan image 50 are displayed.

Figure 7C:
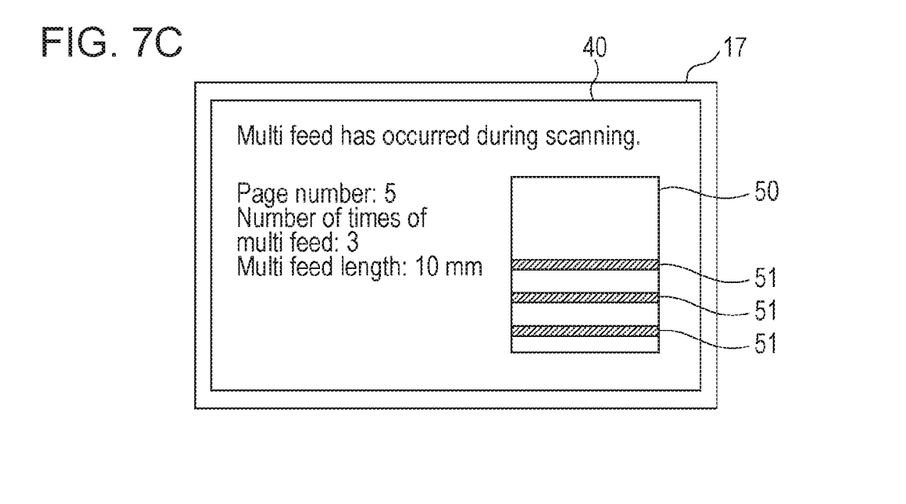
FIG. 7C is a diagram showing another example of a notification screen in step S270.

FIG. 7C shows an example of the notification screen 40 displayed in step S270, which is different from that of the notification screen 40 of FIG. 7A. The way of viewing FIG. 7C is the same as the way of viewing FIG. 7A. According to the notification screen 40 of FIG. 7C, the user recognizes that the multi feed is detected three times during the transport of the document M of the page number "5", and the multi feed length of each of the multi feed ranges is 10 mm. Of course, when the multi feed length differs for each multi feed range, the multi feed length may be displayed for each multi feed range. Three times as the number of times of multi feed shown in FIG. 7C is a number larger than the threshold value TH2. Therefore, assuming the second embodiment, step S270 is performed after steps S225, S240, and S260.

5. Third Embodiment

Figure 8:
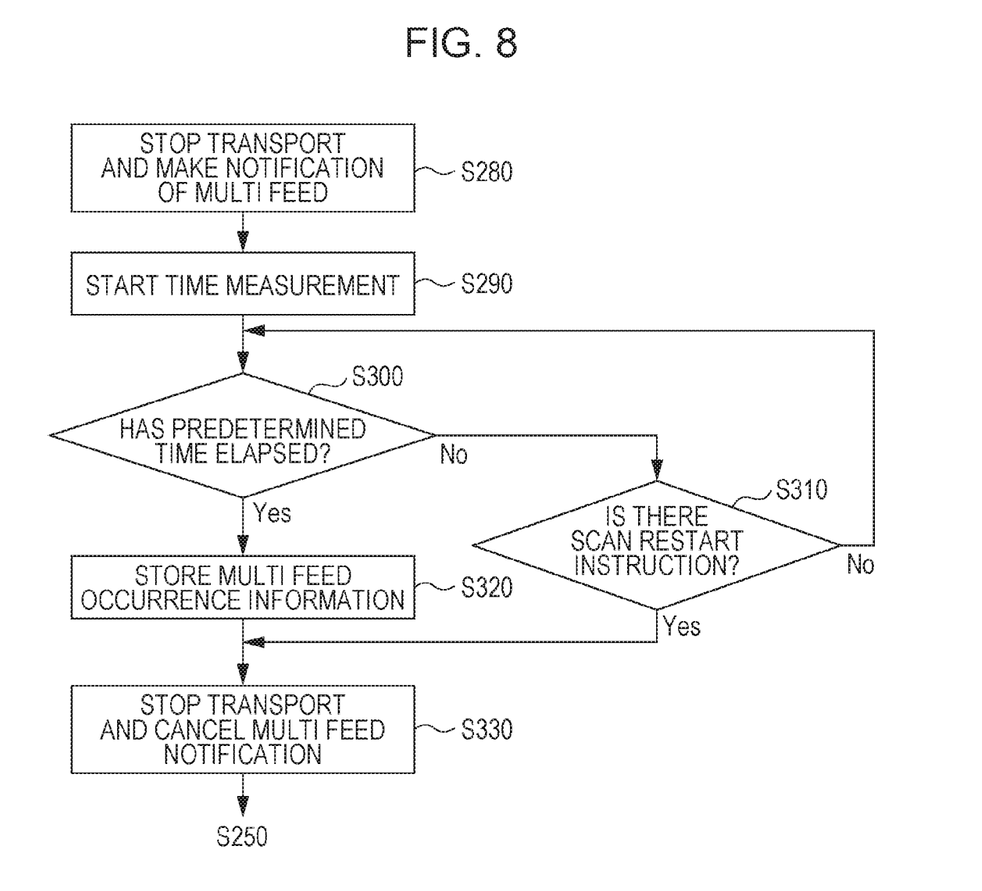
FIG. 8 is a flowchart showing part of a reading control process according to a third embodiment.

FIG. 8 is a flowchart showing a reading control process performed by the controller 11 according to the program 11e. However, FIG. 8 is based on the first embodiment and the second embodiment, and extracts and shows the process subsequent to step S280. The process described with reference to FIG. 8 is referred to as the "third embodiment".

After step S280, controller 11 starts time measurement (step S290). In step S300, the controller 11 determines whether a predetermined time has elapsed since the time measurement was started in step S290, and advances the process to step S310 as a result of the "No" determination when the predetermined time has not elapsed.

In step S310, the controller 11 determines whether there is an external scan restart instruction, and returns the process to the determination in step S300 as a result of the "No" determination when there is no scan restart instruction. The user recognizing the multi feed notification in step S280 resets the document M discharged in the multi-fed state on the document tray 36, or takes the document M stopped in the middle of the transport path 33 in the multi-fed state out from the reading apparatus 10 to reset the taken document M on the document tray 36, and then operates the operation reception unit 16 to input a scan restart instruction. The scan restart instruction is an operation for canceling the transport stop in step S280.

According to FIG. 8, when the scan restart instruction is input from the outside before the predetermined time has elapsed after making a notification of the transport stop and the multi feed in step S280, the controller 11 advances the process to step S330 as a result of the "Yes" determination in step S310. On the other hand, when the scan restart instruction is not input from the outside before the predetermined time elapses after making a notification of the transport stop and the multi feed in step S280, the controller 11 advances the process to step S320 as a result of the "Yes" determination in step S300 to. Here, the predetermined time is, for example, a preset time of about several minutes.

In step S320, as in step S240, controller 11 stores, in a predetermined storage unit, multi feed occurrence information indicating that the multi feed has occurred to the document M. The document M in step S320 is, of course, the document M that was being transported until immediately before stopping the transport in step S280. The controller 11 advances the process to step S330 after step S320.

In step S330, the controller 11 cancels the transport stop and the multi feed notification in step S280. For example, the display of the notification screen 41 of the display unit 17 is turned off by cancelling the multi feed notification. In addition, when the transport stop in step S280 is the second transport stop process, by cancelling the transport stop, the document M stopped in the middle of the transport path 33 is transported again by the rotation of the third roller pair 12a3, 12b3 to be discharged. However, when the transport stop in step S280 is the first transport stop process, the transport of the document M is not performed at the timing when the transport stop is cancelled in step S330.

After step S330, the controller 11 advances the process to the determination of step S250. According to FIG. 8 and the flow of step S100 after the determination of step S250, when the transport unit 12 stops the transport of the following document M, that is, when step S280 is performed, the controller 11 causes the transport unit 12 to perform the transport of the following document M when a predetermined time elapses without an operation of canceling the stop being input from the outside. The multi feed occurrence information stored in step S320 may be notified to the outside in subsequent step S270.

6. Summary

Thus, according to the present embodiment, the reading apparatus 10 includes the transport unit 12 that transports the document M along the transport path 33, a multi feed detection unit that detects multi feed for a transport document that is the document M being transported by the transport unit 12, the reading unit 15 that reads the transport document, and the controller 11 that controls the transport unit 12. The controller 11 acquires a multi feed length that is a length of a range in which the multi feed occurs in the transport document according to a detection result of the multi feed by the multi feed detection unit, causes the transport unit 12 to stop transport of the document M following the transport document when the multi feed length is equal to or greater than the predetermined threshold value TH1 for the multi feed length, and causes the transport unit 12 to perform transport of the following document M when the multi feed length is less than the threshold value TH1.

According to the configuration, it can be said that there is a high possibility of the multi feed in which a plurality of documents M is actually transported in an overlapping manner when the multi feed length of the transport document is equal to or greater than the threshold value TH1, so that the controller 11 stops transport of the following document M. As a result, the user can avoid complicated work such as searching for some, of the documents M, that were not read due to the multi feed after the completion of the transport of all the documents and scanning them again. When the multi feed length is less than the threshold value TH1, the controller 11 performs transport of the following document M because the necessity of stopping the transport is low. As a result, for example, when a relatively small label or a sticky note is pasted on the transport document and there is no problem in transporting the following document M, it is possible to avoid a situation in which the transportation is stopped and the work efficiency of the user is reduced. That is, in the present embodiment, the user convenience is improved by appropriately switching performance/non-performance of the transport of the following document M according to the multi feed length.

Further, according to the present embodiment, the controller 11 determines in step S250 that there is a following document, and advances the process to step S100 to start the paper feeding the following document M. Therefore, when the multi feed length is determined to be equal to or greater than the threshold value TH1 in step S230 and the process proceeds to step S280, the paper feeding of the following document M is not started, and the following document M has not been taken into the transport path 33. For this reason, the user who has recognized the transport stop in step S280 is not required to perform a complicated operation of taking out the following document M, whose portion has begun to be taken into the transport path 33, from the transport path 33 whether the transport stop is the first transport stop process or the second transport stop process.

According to the present embodiment, the controller 11 may store, in a predetermined storage unit, multi feed occurrence information indicating that multi feed occurs to the transport document when the multi feed length is less than the threshold value TH1. According to the configuration, the controller 11 can transport the following document M while storing the multi feed occurrence information in the storage unit in a situation where the possibility that the multi feed has actually occurred to the transport document is not high, but is not zero.

According to the present embodiment, the controller 11 may display the multi feed occurrence information stored in the storage unit on a predetermined display unit when the transport unit 12 completes transport of a plurality of the documents M placed on the document tray 36 upstream of the transport path 33. According to the configuration, after the transport of the plurality of documents M set on the document tray 36 is completed, the user, for example, visually recognizes the multi feed occurrence information displayed as the notification screen 40 on the display unit 17 to validate what kind of multi feed has occurred.

According to the present embodiment, the controller 11 may cause the transport unit 12 to perform transport of the following document when a predetermined time elapses without an operation for canceling the stop being input from an outside in a case in which the transport unit 12 stops transport of the following document M. According to the configuration, when a state in which the operation for canceling the stop is not input due to a reason that the user is not near the reading apparatus 10 or the like continues for some time after stopping transport of the following document M, the controller 11 performs the transport of the following document M. As a result, a situation in which the reading apparatus 10 continues to be occupied by the reading control process while the reading control process for the plurality of documents M is interrupted.

According to the present embodiment, the controller 11 may acquire a number of times of the multi feed that is the number of ranges in which multi feed occurs in the transport document according to a multi feed detection result by the multi feed detection unit, causes the transport unit 12 to stop transport of the following document M when the number of times of the multi feed is less than the predetermined threshold value TH2 for the number of times of the multi feed and the multi feed length is equal to or greater than the threshold value TH1, and causes the transport unit 12 to transport the following document M when the number of times of the multi feed is equal to or greater than the threshold value TH2 or the multi feed length is less than the threshold value TH1. According to the configuration, since it is more likely that the multi feed have been detected a plurality of times due to a plurality of labels or stickers attached to the transport document rather than actual occurrence of the multi feed when the number of times of the multi feed of the transport document is equal to or greater than the threshold value TH2, the controller 11 performs the transport of the following document M. As a result, the possibility of stopping the transport to reduce the work efficiency of the user can be further reduced.

In the present embodiment, the threshold value TH1 and the threshold value TH2 can be set to various values. As an example, the threshold value TH2 for the number of times of the multi feed is set to two times. With such a setting, in the second embodiment, when the number of times of the multi feed detected for the transport document is plural, the controller 11 may make the "No" determination in step S225, and transport the following document M.

The present embodiment discloses a method for detecting the multi feed performed by the reading apparatus 10, the program 11e that implements this method in cooperation with hardware, and a memory that stores the program 11e. The multi feed detection method includes a multi feed detection step of detecting multi feed for the transport document, a multi feed length acquiring step of acquiring a multi feed length according to a detection result of the multi feed, and a transport control step of causing the transport unit 12 to stop transport of a document following the transport document when the multi feed length is equal to or greater than the predetermined threshold value TH1 for the multi feed length, and causing the transport unit 12 to transport the following document when the multi feed length is less than the threshold value TH1.

What is claimed is:

1. A reading apparatus comprising:
a transport unit that transports a document along a transport path;
a multi feed detection unit that detects multi feed for a transport document that is the document being transported by the transport unit;
a reading unit that reads the transport document; and a controller that controls the transport unit, wherein
the controller acquires a multi feed length that is a length of a range in which multi feed occurs in the transport document according to a detection result of the multi feed by the multi feed detection unit, causes the transport unit to stop transport of a document following the transport document when the multi feed length is equal to or greater than a predetermined threshold value for the multi feed length, and causes the transport unit to perform transport of the following document when the multi feed length is less than the threshold value.

2. The reading apparatus according to claim 1, wherein the controller stores, in a predetermined storage unit, multi feed occurrence information indicating that multi feed occurs to the transport document when the multi feed length is less than the threshold value.

3. The reading apparatus according to claim 2, wherein the controller displays the multi feed occurrence information stored in the storage unit on a predetermined display unit when the transport unit completes transport of a plurality of the documents placed on a document tray upstream of the transport path.

4. The reading apparatus according to claim 1, wherein the controller causes the transport unit to perform transport of the following document when a predetermined time elapses without an operation for canceling the stop being input from an outside in a case in which the transport unit stops transport of the following document.

5. The reading apparatus according to claim 1, wherein the controller acquires a number of times of multi feed that is the number of ranges in which the multi feed occurs in the transport document according to a multi feed detection result by the multi feed detection unit, causes the transport unit to stop transport of the following document when the number of times of the multi feed is less than a predetermined threshold value for the number of times of the multi feed and the multi feed length is equal to or greater than a threshold value for the multi feed length, and causes the transport unit to transport the following document when the number of times of the multi feed is equal to or greater than the threshold value for the number of times of the multi feed or the multi feed length is less than the threshold value for the multi feed length.

6. A multi feed detection method of a reading apparatus including a transport unit that transports a document along a transport path and a reading unit that reads a transport document that is the document transported by the transport unit, the method comprising:
a multi feed detection step of detecting multi feed for the transport document;
a multi feed length acquiring step of acquiring a multi feed length that is a length of a range in which multi feed occurs in the transport document according to a detection result of the multi feed; and
a transport control step of causing the transport unit to stop transport of a document following the transport document when the multi feed length is equal to or greater than a predetermined threshold value for the multi feed length, and causing the transport unit to transport the following document when the multi feed length is less than the threshold value.

* * * * *